(12) United States Patent
Kanie

(10) Patent No.: US 7,143,485 B2
(45) Date of Patent: Dec. 5, 2006

(54) CLIP FOR ATTACHMENT TO A SHEET MEMBER

(75) Inventor: Hideki Kanie, Nissin (JP)

(73) Assignee: Newfrey LLC., Newark, DE (US)

( * ) Notice: Subject to any disclaimer, the term of this patent is extended or adjusted under 35 U.S.C. 154(b) by 0 days.

(21) Appl. No.: 10/668,203

(22) Filed: Sep. 24, 2003

(65) Prior Publication Data

US 2004/0099552 A1 May 27, 2004

(30) Foreign Application Priority Data

Sep. 25, 2002 (JP) ............................. 2002-279600

(51) Int. Cl.
*A44B 21/00* (2006.01)
(52) U.S. Cl. .................... 24/453; 24/297; 411/340
(58) Field of Classification Search ............ 24/297, 24/453, 289, 290, 291, 292, 662, 458, 457; 411/508, 173–175, 340, 44, 908
See application file for complete search history.

(56) References Cited

U.S. PATENT DOCUMENTS

| | | | | |
|---|---|---|---|---|
| 3,651,734 A | * | 3/1972 | McSherry | .................. 411/913 |
| 4,122,583 A | * | 10/1978 | Grittner et al. | ................ 24/297 |
| 4,499,636 A | * | 2/1985 | Tanaka | ........................ 24/289 |
| 4,850,773 A | | 7/1989 | Asami | ........................ 411/173 |
| 4,890,966 A | * | 1/1990 | Umezawa | .................. 411/340 |
| 4,920,618 A | * | 5/1990 | Iguchi | ......................... 24/453 |
| 5,411,310 A | * | 5/1995 | Viertel et al. | .............. 296/97.9 |
| 5,775,861 A | * | 7/1998 | Leon et al. | .................. 411/340 |

FOREIGN PATENT DOCUMENTS

| | | |
|---|---|---|
| DE | 35 17 620 | 11/1985 |
| FR | 2 796 367 | 1/2001 |
| JP | 60-185710 | 12/1985 |
| JP | 63-188315 | 12/1988 |
| JP | 7-10517 | 2/1995 |
| JP | 7-20402 | 4/1995 |

* cited by examiner

*Primary Examiner*—Jack W. Lavinder
(74) *Attorney, Agent, or Firm*—Miles & Stockbridge P.C.

(57) ABSTRACT

A spacer clip is attached to a sheet member via a through-hole from one side of the sheet member. The clip has a shank with a flange at one end and arms hinged to the opposite end for insertion in the through-hole in advance of the shank. The arms have levers that engage the flange side of the sheet member, and the arms rotate with the levers as the shank is inserted in the through-hole to a position at which portions of a through-hole section of the sheet member enter spaces between the arms and their levers, and the arms and the flange contact opposite sides of the sheet member.

18 Claims, 5 Drawing Sheets

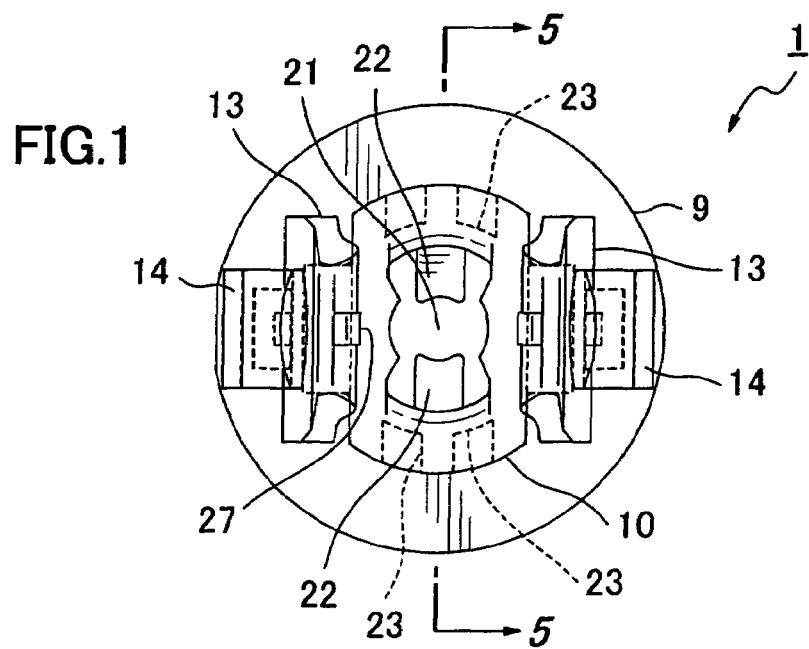
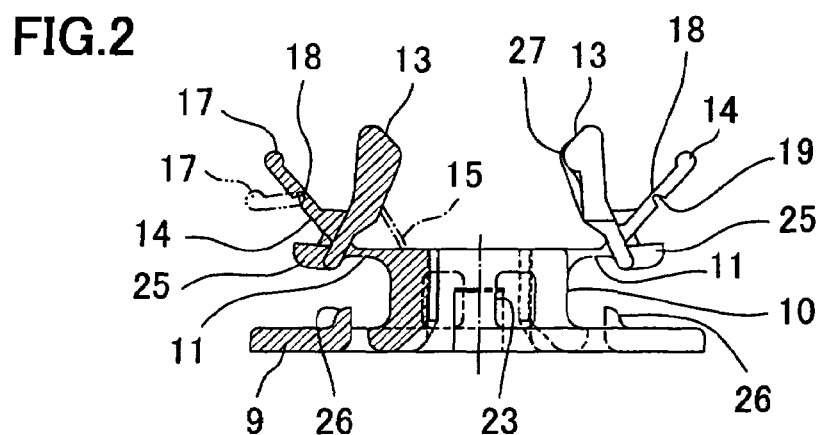
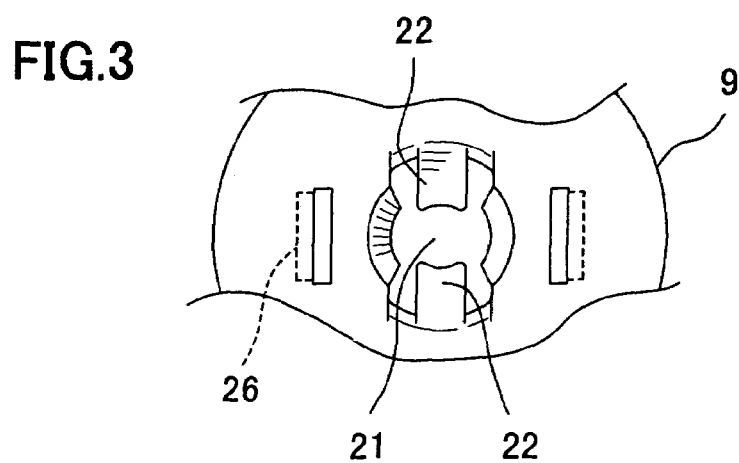

CLIP FOR ATTACHMENT TO A SHEET MEMBER

CROSS REFERENCE TO RELATED APPLICATION

This application claims the benefit of Japanese Patent Application No. 2002-279600 filed Sep. 25, 2002, incorporated herein by reference.

BACKGROUND OF THE INVENTION

This invention relates to a clip, more particularly a spacer clip, for attachment to a member, such as a soft sheet member (attached member), via a through-hole in the member.

Clips used to attach a soft sheet member such as a mat to a car body are well known, as disclosed, for example, in Japanese Unexamined Utility Model Application Disclosure No. 60-185710. This clip comprises a flange able to make contact with a surface on one side of a sheet member, a shank extending at one end from the flange to a predetermined height for insertion into a through-hole of the sheet member, and a pair of arms extending from an opposite end of the shank and hinged thereto so both arms can rotate from an initial posture along the axis of the shank to a posture substantially parallel to the flange (an interposed posture) in contact with an opposite surface of the attached member. The pair of arms held in the initial posture are rotated by a worker to the interposed posture and are locked to remain in the interposed posture. The shank is hollow and contains a pawl for engaging a threaded stud fixed to the car body to attach a mat to the car body.

Japanese Unexamined Utility Model Application Disclosure No. 63-188315 discloses a clip for attaching a hard panel such as a finisher to a car body using a threaded stud fixed to the car body. This clip comprises a flange able to make contact with the front surface of the panel, a shank extending from the flange a length 3 to 4 times the thickness of the flange, and a pair of arms that engage the back surface of the panel to keep it from falling off. The arms are hinged to an end of the shank so both arms can rotate from an initial posture along the axis of the shank to an interposed posture substantially parallel to the flange. The clip also comprises a pair of engaging plates that extend at a right angle to the arms from the base section of the arms so as to rotate with the arms and engage a through-hole section of the panel and make contact with the flange after rotation. The shank is hollow and contains a pawl for engaging a threaded stud fixed to the car body and for attaching a mat to the car body. The threaded stud fixed to the car body extends in the through-hole of the panel to the panel surface. When a worker presses on the clip so the shank passes through the through-hole and receives the threaded stud, the arms rotate from the initial posture to the posture parallel to the flange to form a base for preventing the panel from falling off. The engaging plates rotate with the arms and strongly engage the through-hole portion of the panel. Because the clip is secured to the panel and the pawl in the shank is engaged with the threaded stud, the panel is secured to the car body by the clip.

Japanese Unexamined Utility Model Application Disclosure No. 7-20402 discloses a so-called pantograph clip. This spacer clip comprises a flange able to make contact with one side of a sheet member, a shank extending from the flange to a height corresponding to the thickness of the sheet member and able to be inserted into a through-hole of the sheet member, and a pantograph-shaped engaging band extending from the end of the shank and able to be folded to an interposed posture substantially parallel with the flange. This engaging band has through-holes and is folded in a posture extending to the surface of the sheet member opposite the flange, and works with the flange to reach a posture interposing the sheet member and securing the sheet member. The shank has a hollow section with a pawl to engage a threaded stud fixed to a car body and to secure the sheet member fixed by the spacer clip to the car body. This spacer clip is used to attach a sheet member to a car body while keeping the sheet member at a constant thickness without distortion, even when the sheet member is made of a soft material.

Japanese Unexamined Utility Model Application Disclosure No. 7-10517 discloses a clip able to secure a soft sheet member such as a dash silencer to a sheet member placed on a panel of a car body. This clip comprises two flanges for pressing down the surface sheet material from both sides, and a shank extending between both flanges at a length corresponding to the thickness of the sheet member. One of the flanges and the shank have flat surfaces along the center line of the shank divided in half along the center line, and the other flange is connected to the flat surfaces via a hinge. When attaching the clip to the sheet member, flange portions connected via the hinge are rotated at the hinge and separated from the other flange and the shank to form a V-shape. Both edges of the flange portions connected and rotated via the hinge are inserted into a through-hole in the sheet member, and pushed in so divided flange portions and shank portions are brought together. This attaches the clip to the sheet member. A pawl is formed in the clip shank to secure the sheet member attached to the clip to a car body containing a threaded stud.

The clip described in Japanese Unexamined Utility Model Disclosure No. 60-185710 functions as a spacer clip able to interpose a sheet between arms and a flange, but in order to attach the clip to the sheet member, arms and the shank are passed through a through-hole on one side of the sheet member, and a worker has to manually rotate the arms on the other side while stretching the sheet member on both sides. If the sheet member is large, another worker has to lend a hand.

In the clip described in Japanese Unexamined Utility Model Disclosure No. 63-188315, the arms are inserted into a through-hole in the panel, and the engaging plates are brought into contact with the panel surface so as to rotate the arms. The insertion of the arms forms a base in the back surface of the panel to keep the panel from falling off, and the engaging plates rotate so as to strongly engage the through-hole section of the panel. Because this clip is secured to the panel simply by pushing it into place, it can be worked from one side of the panel. However, because the clip is designed to secure a hard panel, it cannot be used with a soft sheet member. A strong force is used to strongly engage the engaging plates to the through-hole section of the panel. However, such force cannot be used to strongly engage the engaging plates to the through-hole section of a soft sheet member. Much less force has to be used with such an attached member. Also, because the engaging plates strongly engage the side surface of the through-hole of the hard panel, the flange and ends of the engaging plates would dig into the attached member if it were made from a soft sheet material. If the sheet member were thick, the digging in of the flange and plates would be significant and unacceptable.

In the clip described in Japanese Unexamined Utility Model Disclosure No. 7-20402, the pantograph-shaped engaging band is not designed to be able to maintain a posture extending axially with respect to the shank when inserted into the through-hole of a sheet member. As a result, it tends to come undone on the left and right and does not operate smoothly. When the flange is pressed on one side of the sheet member, the pantograph-shaped engaging band has to be folded on the other side, and both sides of the sheet member have to be stretched out manually.

The clip described in Japanese Unexamined Utility Model Disclosure No. 7-10517 can be attached from one side of the sheet member. However, because the shank and one flange are split in half on the rotational center line of the hinge on the other flange, the clip splits in half if the stress concentrated on the hinge causes it to break. If the hinge breaks before being secured, the clip does not work properly and the sheet member is not secured. If the concentrated stress causes the hinge to break after being secured, the clip no longer secures the sheet member and the sheet member may come off of a car body.

BRIEF DESCRIPTIONS OF THE INVENTION

An object of the present invention is to provide a clip able to operate on an attached member such as a soft sheet material from one side, to maintain sufficiently high attachment strength to the attached member, and to attach to the attached member without significantly deforming the attached member even when the attached member is a soft sheet material.

In one embodiment, the present invention is a spacer clip comprising a flange larger than the through-hole in an attached member and able to make contact with one side of the attached member, a shank extending from the flange to a predetermined height for insertion into the through-hole, a pair of arms extending from an end of the shank opposite to the flange and hinged to the shank so both arms can rotate from an initial posture along the axis of the shank to an interposed posture substantially parallel to the flange and in contact with an opposite side of the attached member, and levers extending from the base of respective arms, rotating with the arms, and providing spaces between the arms and the levers for receiving portions of a through-hole section, wherein the arms are in an initial posture axially, and the levers are in an initial posture outwardly from the shank and along the one side of the attached member before the shank is inserted into the through-hole, wherein the arms rotate together with the levers to interpose portions of the through-hole section of the attached member in the spaces as the shank is inserted into the through-hole, and wherein the flange makes contact with the one side of the attached member when the arms have been rotated to the interposed posture.

BRIEF DESCRIPTION OF THE DRAWINGS

The invention will be further described in conjunction with the accompanying drawings, which illustrate preferred (best mode) embodiments of the invention, and wherein:

FIG. 1 is a top plan view of a spacer clip of one embodiment of the invention;

FIG. 2 is a partially sectional side elevation view of the clip of FIG. 1;

FIG. 3 is a fragmentary bottom plan view of the clip;

DETAILED DESCRIPTION OF THE INVENTION

Figure 4:
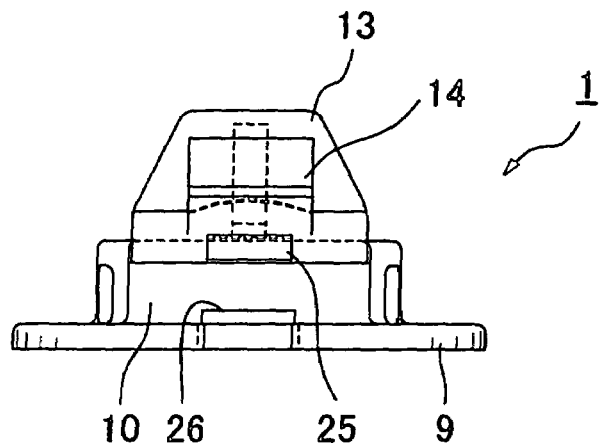
FIG. 4 is an end view of the clip.
Figure 5:
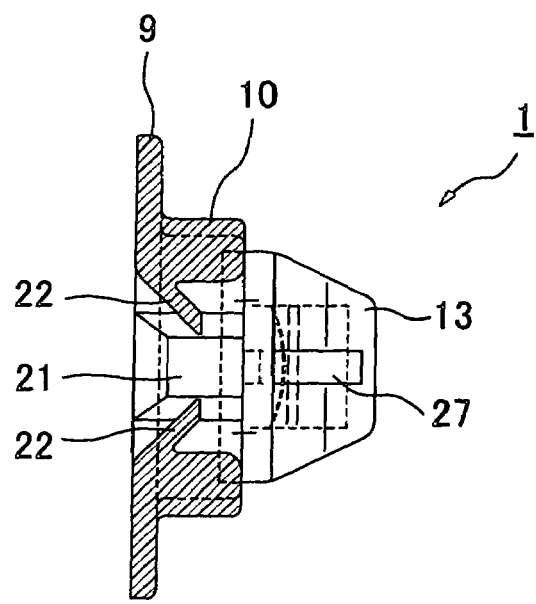
FIG. 5 is a sectional view taken along line 5—5 of FIG. 1.

As described later, in a principal application of the invention, clips according to the invention, sometimes referred to as spacer clips, are used to mount a soft sheet member, such as a silencer, to a car body and to provide a desired spaced relationship. The invention will be described in such an application, but it will become apparent that clips in accordance with the invention are not limited to that application.

FIGS. 1–10 show a first embodiment of the invention in which clips such as clip 1 are attached to a soft sheet member 2, such as a silencer, via through-holes 7, and in which the clips are temporarily attached to studs 5 projecting from a car body 3. The studs may receive nuts 6 for permanent mounting of the soft sheet member 2 on the car body 3, as later described. See, in particular, FIGS. 9 and 10.

Figure 6:
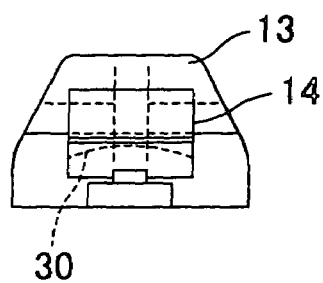
FIG. 6 is an end view of a portion of the clip shown in FIG. 4.
Figure 7:
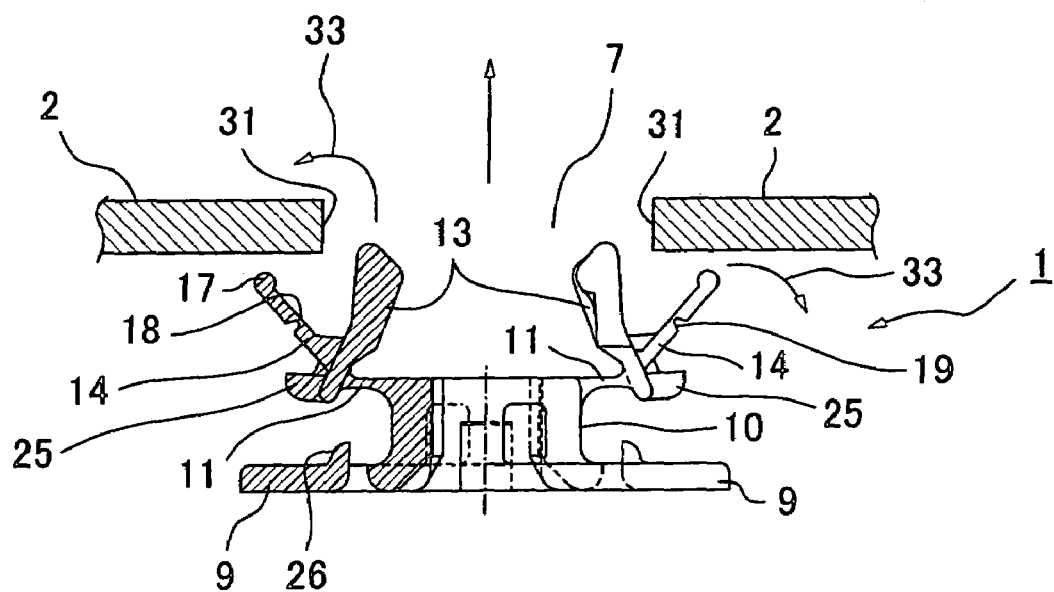
FIG. 7 is an explanatory partly sectional side elevation view in which the clip shown in FIG. 2 is being attached to a sheet member.

As shown in FIGS. 1–6, according to one embodiment of the invention, a clip 1, preferably molded integrally of hard plastic material, comprises a round flange 9 with a diameter larger than the diameter of a through-hole 7 (see FIG. 7). A shank 10, having a height correlated with the thickness of the sheet member 2, and having cross-dimensions correlated with the diameter of the through-hole 7, extends perpendicularly from the flange at one end of the shank.

The clip has a pair of arms 13 projecting from an end of the shank opposite to the flange 9 and connected to the shank by hinges 11, so that both arms 13 can rotate from an initial posture substantially along the axis of the shank 10 to another posture (referred to herein as "an interposed posture") substantially parallel to the flange and in contact with a side of the sheet member opposite to a side of the sheet member engaged by the flange 9 when the clip is attached to the sheet member, as later described.

A pair of levers 14 extend outwardly from the base of respective arms 13 in an initial posture and rotate with the arms. The arms 13 and their levers 14 are paired diametrically of the shank 10. Spaces are provided between the arms and their respective levers for receiving portions of a through-hole section 31 of the sheet member 2.

When the clip 1 is to be attached to the sheet member 2, the flange 9 is pressed in the direction of the straight arrow shown in FIG. 7 to insert the arms 13 into the through-hole 7 in advance of the shank 10. To hold the arms in the initial posture, before insertion, a thin breakable web 15 (one of which is shown in FIG. 2) can attach each arm 13 to the shank. The web can be broken by a worker before the arms are inserted in the through-hole 7. The breakable webs 15 are effective to maintain the arms and their levers in the initial posture during shipping and handling. In the initial posture, the separation between the arms 13 is correlated with the diameter of the through-hole 7 so that the arms can be easily inserted into the through-hole.

When the arms 13 are inserted in the through-hole 7, the levers 14 engage one side of the sheet member 2 facing the flange 9. Each lever 14 has a hinge 18 at a middle portion of its length, so that a tip portion 17 of the lever can bend relative to a base portion of the lever to an extent limited by a stop 19, as shown by the dotted line position of the tip portion in FIG. 2.

Figure 8:
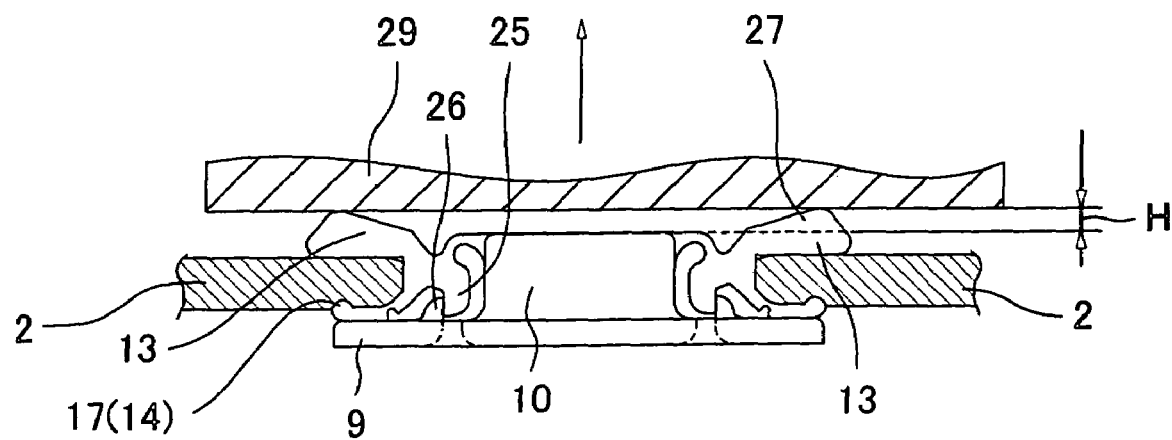
FIG. 8 is a partly sectional side elevation view in which the clip shown in FIG. 7 has been attached to a sheet member.

When the arms 13 are inserted in the through-hole 7, the levers 14 engage the sheet member 2, the arms 13 and the levers 14 rotate outwardly, as shown by the curved arrows 33 in FIG. 7, and portions of the through-hole section 31 of the sheet member enter the spaces between the arms 13 and the levers 14, as shown in FIG. 8. During initial insertion of the clip in the through-hole, the tip portions 17 of the levers rotate away from the respective arms 13, but then the arms rotate toward the tip portions to the interposed posture shown in FIG. 8.

In the interposed posture of the clip on the sheet member 2, the flange 9 contacts an opposed side of the sheet member 2. The levers 14 can be made narrower and thinner than the arms 13 so that there is little deformation of a soft sheet member by the levers, which come to rest between the sheet member and the flange when the flange presses the levers into the soft sheet member.

Cooperable locking pawls are provided to lock the clip in the interposed posture. As shown in FIGS. 2, 7, and 8, the base of each arm 13 can be provided with an arm-end locking pawl 25 near the corresponding hinge 11, and the flange 9 can be provided with a flange-end locking pawl 26 cooperable with the arm-end locking pawl 25. Alternatively, locking pawls 26 can be provided on the shank 10 rather than on the flange 9. Opposing, initially-engaging surfaces of the cooperable locking pawls may be curved to facilitate engagement of the locking pawls, and either or both of the cooperable locking pawls may be sufficiently resilient to permit one of the cooperable locking pawls to pass over the other until opposing flat surfaces of the locking pawls contact one another as shown in FIG. 8.

Initial contact of the cooperable locking pawls may cause a rebound effect in which the arms 13 tend to move away from contact with the sheet member 2, but a backing member 29 shown in FIG. 8 may be used to counter the rebound effect and to force engagement of the cooperable locking pawls by pressure on protrusions 27 of the arms 13. As shown in FIG. 8, the protrusions 27 project by a distance "H" above an end of the shank 10.

As shown in FIG. 8, in the interposed posture, boundary surface portions of the through-hole contact opposed boundary surface portions of the spaces between the arms 13 and the levers 14. As indicated in FIG. 6 by the curved dotted line 30, in the embodiment, the boundary surface portions of the spaces between the arms 13 and the levers 14 are curved to complement the curvature of the boundary surface portions of the through-hole.

Figure 9:
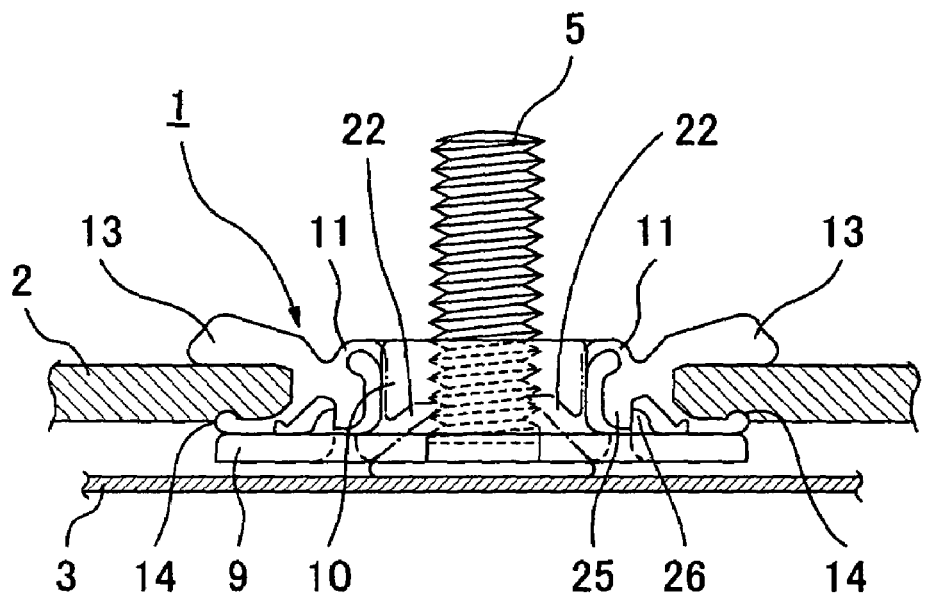
FIG. 9 is a partly sectional side elevation view showing the attached clip of FIG. 8 engaged with a threaded stud for temporarily mounting the sheet member on a car body.
Figure 10:
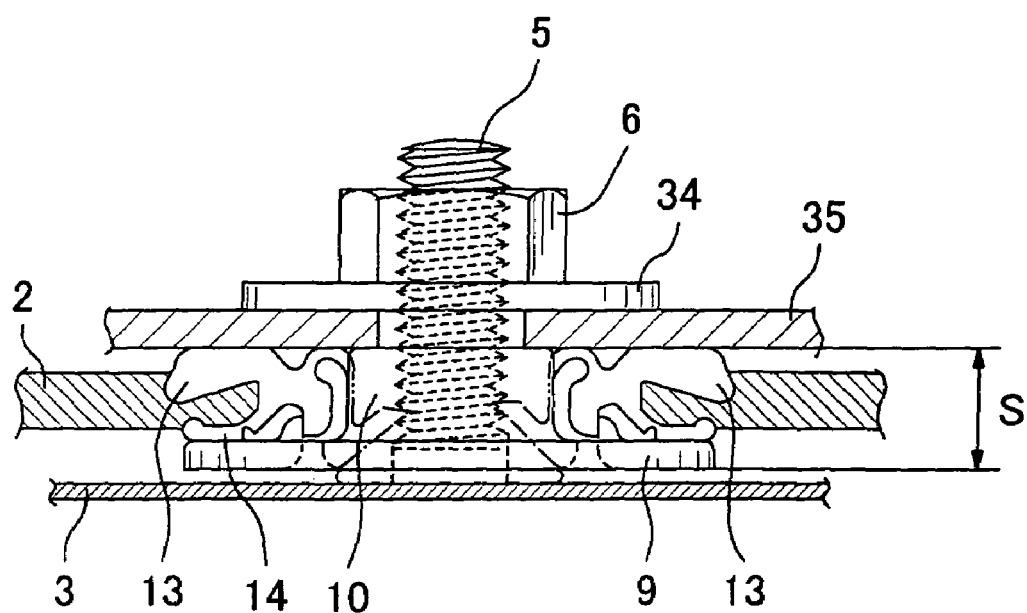
FIG. 10 is a partly sectional side elevation view showing the manner in which the sheet member can be permanently mounted on the car body using the clip and the stud.

FIGS. 9 and 10 show the manner in which a clip 1 of the invention attached to a sheet member 2, such as a soft sheet member used as a silencer, can be used to mount the sheet member on a car body 3, using a threaded stud 5 projecting from the car body. For this purpose, the shank has a hollow section 21, and one or more pawls 22 in the hollow section (see FIGS. 1 and 3) that engage threads of the stud, so that the sheet member 2 is temporarily mounted on the car body 3, as shown in FIG. 9.

As shown in FIG. 10, permanent mounting of the sheet member on the car body can be achieved by the use of nut 6 and washer 34. Another member 35, such as a surface panel for covering the soft sheet member 2, can be arranged between the end of shank 10 and the washer 34.

When attached to another member 35, such as an outer surface panel, via the spacer clip 1, with the sheet member 2 attached to the car body 3, as shown in FIG. 10, the other member 35 is held at a set interval S from the car body 3. With the invention, a soft sheet member 2 can be supported between the car body 3 and the member 35 without distortion.

The height of the shank 10 can be appropriately selected to provide the set interval S. The height depends somewhat on the "sag" (internal contraction) during molding of the plastic clip. Because of the sag and "loss of thickness" in the sidewall portion of the shank, recesses 23 may form, as shown in FIGS. 1 and 2. The cross-dimensions of the shank (e.g., diameter of the shank) and the shape of the sidewall are optional, so long as the shank can fit into the through-hole in the sheet member 2.

Figure 11:
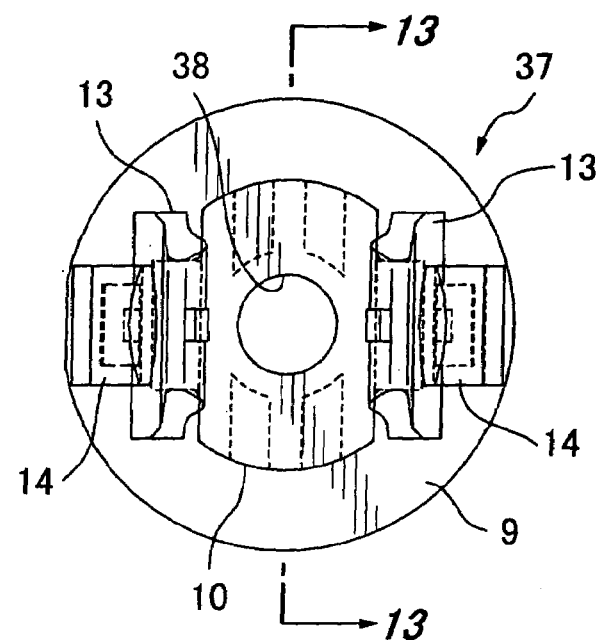
FIG. 11 is a top plan view of a spacer clip of another embodiment of the invention.
Figure 12:
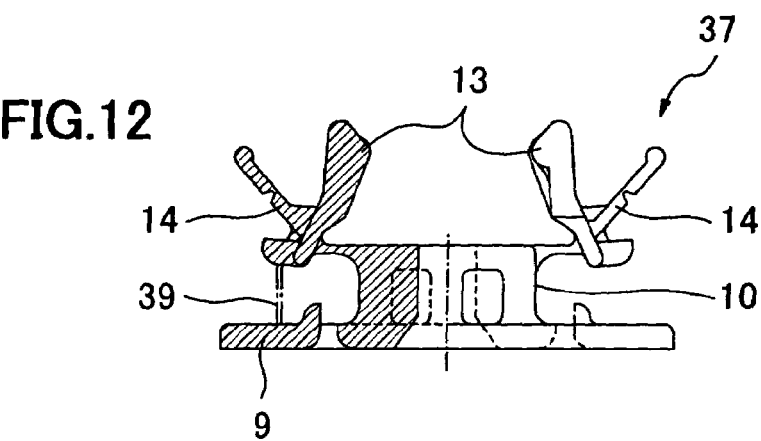
FIG. 12 is a partially sectional side elevation view of the clip of FIG. 11.
Figure 13:
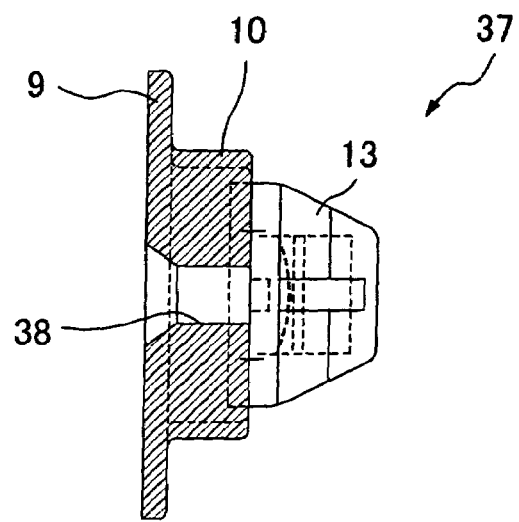
FIG. 13 is a sectional view taken along line 13—13 of FIG. 11.

FIGS. 11–13 show another embodiment of the invention, in which a spacer clip 37 has a simple axial hole 38 in the shank 10 devoid of the internal pawls used in the first embodiment for attachment of the spacer clip to a threaded stud. The simple hole can accommodate a rod-shaped object, which may be smooth or threaded.

When a sheet member 2 is a silencer for covering a wide section of an inside passenger compartment of a car, for example, through-holes 7 can be formed at certain positions in the sheet member corresponding to various mounting positions, and spacer clips can be attached in these through-holes. Spacer clips of the first embodiment can be used to temporarily mount the sheet member on the car body, and spacer clips of the second embodiment can be used, together with spacer clips of the first embodiment, for permanent mounting of the sheet member on a car body.

FIG. 12 shows a breakable web 39 between an arm-end locking pawl and a surface of the flange 9 opposite to the arm-end locking pawl. Such a thin web can be used as an alternative to the thin web 15 of FIG. 2 for each of the arms 13 and their levers 14.

By virtue of the present invention, spacer clips can be easily and reliably attached to a sheet member in through-holes from one side of the sheet member, and when the sheet member is made of a soft material, the attachment can be accomplished without significant distortion of the sheet member.

While preferred embodiments of the invention have been shown and described, it will be apparent that changes can be made without departing from the principles and spirit of the invention, the scope of which is defined in the accompanying claims.

What is claimed is:

1. A clip comprising a flange larger than a through-hole in an attached member, a shank unitary with the flange and extending from the flange at one end of the shank to a predetermined height along a longitudinal axis of the shank for insertion into the through-hole, a pair of arms extending from an opposite end of the shank and hinged thereto for rotation relative to the shank, and levers extending from bases of respective arms, connected thereto for rotation with the arms, and providing spaces with respect to the arms for receiving portions of a through-hole section of the attached member between the arms and the levers, wherein, the clip is constructed so that in an initial posture of the clip, the arms extend substantially axially of the shank beyond said opposite end of the shank, and the levers extend beyond said opposite end of the shank longitudinally away from the shank and laterally away from the shank to form acute angles with respect to the longitudinal axis of the shank, so that tip portions of the levers are disposed to engage one side of the attached member before the shank is inserted into the through-hole, and wherein the clip is constructed so that when the shank is inserted into the through-hole, the arms rotate together with the levers from the initial posture to an interposed posture at which the portions of the through-hole section of the attached member are received in the spaces, at which the levers are in contact with said one side of the attached member, the arms are substantially parallel to the flange and in contact with an opposite side of the attached member, and the flange is juxtaposed with the one side of the attached member, wherein each arm has an arm-end locking pawl at the base thereof extending towards the flange when the arm is in the interposed posture, and wherein cooperable flange-end locking pawls are formed on the flange to engage the arm-end locking pawls and keep the arms in the interposed posture.

2. The clip of claim 1, wherein the arms and levers are paired diametrically with respect to the shank.

3. The clip of claim 1, wherein a protrusion is formed on each arm protruding a fixed height from the opposite end of the shank when the arm is in the interposed posture, and wherein a force to engage each arm-end locking pawl with the cooperable flange-end locking pawl is obtained from pressure on the protrusions.

4. The clip of claim 1, wherein the shank and the arms are connected by breakable thin webs for reliably keeping the arms and levers in the initial posture.

5. The clip of claim 1, wherein the arm-end locking pawls and the flange are connected by breakable thin webs for reliably keeping the arms and levers in the initial posture.

6. A clip comprising a flange larger than a through-hole in an attached member, a shank unitary with the flange and extending from the flange at one end of the shank to a predetermined height along a longitudinal axis of the shank for insertion into the through-hole, a pair of arms extending from an opposite end of the shank and hinged thereto for rotation relative to the shank, and levers extending from bases of respective arms, connected thereto for rotation with the arms, and providing spaces with respect to the arms for receiving portions of a through-hole section of the attached member between the arms and the levers, wherein, the clip is constructed so that in an initial posture of the clip, the arms extend substantially axially of the shank beyond said opposite end of the shank, and the levers extend beyond said opposite end of the shank longitudinally away from the shank and laterally away from the shank to form acute angles with respect to the longitudinal axis of the shank, so that tip portions of the levers are disposed to engage one side of the attached member before the shank is inserted into the through-hole, and wherein the clip is constructed so that when the shank is inserted into the through-hole, the arms rotate together with the levers from the initial posture to an interposed posture at which the portions of the through-hole section of the attached member are received in the spaces, at which the levers are in contact with said one side of the attached member, the arms are substantially parallel to the flange and in contact with an opposite side of the attached member, and the flange is juxtaposed with the one side of the attached member, wherein the levers are hinged at a middle position thereof to allow a tip portion of the levers to rotate relative to base portion of the levers.

7. A clip comprising a flange larger than a through-hole in an attached member, a shank unitary with the flange and extending from the flange at one end of the shank to a predetermined height along a longitudinal axis of the shank for insertion into the through-hole, a pair of arms extending from an opposite end of the shank and having base portions connected thereto by hinges for rotation of the arms relative to the shank, and levers extending from respective arms, and having base portions connected to the base portions of the respective arms adjacent to the hinges for rotation of the levers with the arms, and providing spaces with respect to the arms for receiving portions of a through-hole section of the attached member between the arms and the levers, wherein, the clip is constructed so that in an initial posture of the clip, the arms extend substantially axially of the shank beyond said opposite end of the shank, and the levers extend beyond said opposite end of the shank longitudinally away from the shank and laterally away from the shank to form acute angles with respect to the longitudinal axis of the shank, so that tip portions of the levers are disposed to engage one side of the attached member before the shank is inserted into the through-hole, and wherein the clip is constructed so that when the shank is inserted into the through-hole, the arms rotate together with the levers from the initial posture to an interposed posture at which the portions of the through-hole section of the attached member are received in the spaces, at which the levers are in contact with said one side of the attached member, the arms are substantially parallel to the flange and in contact with an opposite side of the attached member, and the flange is juxtaposed with the one side of the attached member, wherein boundary surfaces of the spaces between the arms and the levers contact curved boundary surface portions of the through-hole of the attached member and are similarly curved.

8. A clip comprising a flange larger than a through-hole in an attached member, a shank unitary with the flange and extending from the flange at one end of the shank to a predetermined height along a longitudinal axis of the shank for insertion into the through-hole, a pair of arms extending from an opposite end of the shank and hinged thereto for rotation relative to the shank, and levers extending from bases of respective arms, connected thereto for rotation with the arms, and providing spaces with respect to the arms for receiving portions of a through-hole section of the attached member between the arms and the levers, wherein, the clip is constructed so that in an initial posture of the clip, the arms extend substantially axially of the shank beyond said opposite end of the shank, and the levers extend beyond said opposite end of the shank longitudinally away from the shank and laterally away from the shank to form acute angles with respect to the longitudinal axis of the shank, so that tip portions of the levers are disposed to engage one side of the attached member before the shank is inserted into the through-hole, and wherein the clip is constructed so that when the shank is inserted into the through-hole, the arms rotate together with the levers from the initial posture to an interposed posture at which the portions of the through-hole section of the attached member are received in the spaces, at which the levers are in contact with said one side of the attached member, the arms are substantially parallel to the flange and in contact with an opposite side of the attached member, and the flange is juxtaposed with the one side of the attached member, wherein the shank has a hollow section to accommodate a threaded stud, and wherein the hollow section has a pawl for engaging the threaded stud.

9. A clip comprising a flange larger than a through-hole in an attached member, a shank unitary with the flange and extending from the flange at one end of the shank to a predetermined height along a longitudinal axis of the shank for insertion into the through-hole, a pair of arms extending from an opposite end of the shank and hinged thereto for rotation relative to the shank, and levers extending from bases of respective arms, connected thereto for rotation with the arms, and providing spaces with respect to the arms for receiving portions of a through-hole section of the attached member between the arms and the levers, wherein, the clip is constructed so that in an initial posture of the clip, the arms extend substantially axially of the shank beyond said opposite end of the shank, and the levers extend beyond said opposite end of the shank longitudinally away from the shank and laterally away from the shank to form acute angles with respect to the longitudinal axis of the shank, so that tip portions of the levers are disposed to engage one side of the attached member before the shank is inserted into the through-hole, and wherein the clip is constructed so that when the shank is inserted into the through-hole, the arms rotate together with the levers from the initial posture to an interposed posture at which the portions of the through-hole section of the attached member are received in the spaces, at which the levers are in contact with said one side of the attached member, the arms are substantially parallel to the flange and in contact with an opposite side of the attached member, and the flange is juxtaposed with the one side of the attached member, wherein the shank has a hollow section to accommodate a rod-shaped object such as a stud or bolt, and wherein the hollow section is devoid of a pawl.

10. A clip for attachment to a sheet member via a through-hole in the sheet member, comprising:

a shank having unitarily therewith at one end a flange to be disposed at one side of the sheet member against a through-hole section of the sheet member, the shank having cross-dimensions parallel to the flange and having a length along a longitudinal axis perpendicular to the flange to permit the shank to be inserted through the through-hole in the sheet member from an initial posture to an interposed posture;

a pair of arms having base portions connected by hinges to an end of the shank opposite to the flange and projecting substantially axially of the shank in the initial posture for insertion into the through-hole in advance of the shank; and a pair of levers having base portions attached to the base portions of respective arms adjacent to the hinges and projecting beyond said opposite end of the shank longitudinally away from the shank and laterally away from the shank to form acute angles with respect to the longitudinal axis of the shank so that in the initial posture tip portions of the levers are disposed for engagement with said one side of the sheet member, wherein the construction of the clip is such that as the shank is inserted into the through-hole, the arms and the levers rotate to the interposed posture, at which the arms contact a side of the sheet member opposite to said one side, the levers contact said one side of the sheet member, portions of the through-hole section are received in spaces between the arms and the respective levers, and the flange contacts the levers and is juxtaposed with said one side of the sheet member, wherein each arm and a portion of the flange have cooperable pawls that engage one another to maintain the interposed posture.

11. A clip according to claim 10, wherein each lever has a hinge at a middle portion so that a tip portion of the lever can bend relative to the base portion of the lever when the tip portion engages said one side of the sheet member.

12. A clip according to claim 10, wherein each arm has a protrusion that faces away from the sheet member in the interposed posture.

13. A clip according to claim 10, wherein each arm has a breakable element for maintaining the initial posture of the arm.

14. A clip for attachment to a sheet member via a through-hole in the sheet member, comprising:

a shank having unitarily therewith at one end a flange to be disposed at one side of the sheet member against a through-hole section of the sheet member, the shank having cross-dimensions parallel to the flange and having a length along a longitudinal axis perpendicular to the flange to permit the shank to be inserted through the through-hole in the sheet member from an initial posture to an interposed posture;

a pair of arms having base portions connected by hinges to an end of the shank opposite to the flange and projecting substantially axially of the shank in the initial posture for insertion into the through-hole in advance of the shank; and a pair of levers having base portions attached to the base portions of respective arms adjacent to the hinges and projecting beyond said opposite end of the shank longitudinally away from the shank and laterally away from the shank to form acute angles with respect to the longitudinal axis of the shank so that in the initial posture tip portions of the levers are disposed for engagement with said one side of the sheet member, wherein the construction of the clip is such that as the shank is inserted into the through-hole, the arms and the levers rotate to the interposed posture, at which the arms contact a side of the sheet member opposite to said one side, the levers contact said one side of the sheet member, portions of the through-hole section are received in spaces between the arms and the respective levers, and the flange contacts the levers and is juxtaposed with said one side of the sheet member, wherein the shank has a hollow section for receiving a stud therein.

15. A clip according to claim 14, wherein the shank has at least one pawl inside the hollow section for engaging a threaded stud.

16. A clip for attachment to a sheet member via a through-hole in the sheet member, comprising:

a shank having unitarily therewith at one end a flange to be disposed at one side of the sheet member against a through-hole section of the sheet member, the shank having cross-dimensions parallel to the flange and having a length along a longitudinal axis perpendicular to the flange to permit the shank to be inserted through the through-hole in the sheet member from an initial posture to an interposed posture;

a pair of arms having base portions connected by hinges to an end of the shank opposite to the flange and projecting substantially axially of the shank in the initial posture for insertion into the through-hole in advance of the shank; and a pair of levers having base portions attached to the base portions of respective arms adjacent to the hinges and projecting beyond said opposite end of the shank longitudinally away from the shank and laterally away from the shank to form acute angles with respect to the longitudinal axis of the shank so that in the initial posture tip portions of the levers are disposed for engagement with said one side of the sheet member, wherein the construction of the clip is such that as the shank is inserted into the through-hole, the arms and the levers rotate to the interposed posture, at which the arms contact a side of the sheet member opposite to said one side, the levers contact said one side of the sheet member, portions of the through-hole section are received in spaces between the arms and the respective levers, and the flange contacts the levers and is juxtaposed with said one side of the sheet member, wherein each arm has an arm-end locking pawls at the base portion thereof extending towards the flange when the arm is in the interposed posture, and wherein cooperable flange-end locking pawls are farmed on the shank near the flange to engage the arm-end locking pawls and keep the arms in the interposed posture.

17. The clip of claim 16, wherein a protrusion is formed on each arm protruding a fixed height from the opposite end of the shank when the arm is in the interposed posture, and wherein a force to engage each arm-end locking pawl with the cooperable flange-end locking pawl is obtained from pressure on the protrusions.

18. A clip for attachment to a sheet member via a through-hole in the sheet member, comprising:

a shank having unitarily therewith at one end a flange to be disposed at one side of the sheet member against a through-hole section of the sheet member, the shank having cross-dimensions parallel to the flange and having a length along a longitudinal axis perpendicular to the flange to permit the shank to be inserted through the through-hole in the sheet member from an initial posture to an interposed posture;

a pair of arms having base portions connected, by hinges to an end of the shank opposite to the flange and projecting substantially axially of the shank in the initial posture for insertion into the through-hole in advance of the shank; and a pair of levers having base portions attached to the base portions of respective arms adjacent to the hinges and projecting beyond said opposite end of the shank longitudinally away from the shank and laterally away from the shank to form acute angles with respect to the longitudinal axis of the shank so that in the initial posture tip portions of the levers are disposed for engagement with said one side of the sheet member, wherein the construction of the clip is such that as the shank is inserted into the through-hole, the arms and the levers rotate to the interposed posture, at which the arms contact a side of the sheet member opposite to said one side, the levers contact said one side of the sheet member, portions of the through-hole section are received in spaces between the arms and the respective levers, and the flange contacts the levers and is juxtaposed with said one side of the sheet member, wherein each arm and a portion of the flange end of the shank have cooperable pawls that engage one another to maintain the interposed posture.

* * * * *